US009544534B2

United States Patent
Bekiares et al.

(10) Patent No.: US 9,544,534 B2
(45) Date of Patent: Jan. 10, 2017

(54) APPARATUS FOR AND METHOD OF IDENTIFYING VIDEO STREAMS TRANSMITTED OVER A SHARED NETWORK LINK, AND FOR IDENTIFYING AND TIME-OFFSETTING INTRA-FRAMES GENERATED SUBSTANTIALLY SIMULTANEOUSLY IN SUCH STREAMS

(71) Applicant: MOTOROLA SOLUTIONS, INC, Schaumburg, IL (US)

(72) Inventors: Tyrone D Bekiares, Park Ridge, IL (US); Hinrich A Schmidt, Algonquin, IL (US); Steven D. Tine, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 450 days.

(21) Appl. No.: 14/035,409

(22) Filed: Sep. 24, 2013

(65) Prior Publication Data

US 2015/0085132 A1    Mar. 26, 2015

(51) Int. Cl.
*H04N 7/18*    (2006.01)
*H04N 7/08*    (2006.01)

(52) U.S. Cl.
CPC ............ *H04N 7/0806* (2013.01); *H04N 7/181* (2013.01)

(58) Field of Classification Search
CPC ........ H04N 7/0806; H04N 7/181; H04N 7/18; H04N 5/23206; H04N 5/2251; H04N 13/00; H04N 1/2112; H04N 1/2116; H04N 5/222; H04N 5/2228; H04N 5/225; H04N 5/2258; H04N 5/2259; H04N 5/23248; G08B 13/196
USPC ....................................................... 348/159
See application file for complete search history.

(56) References Cited

U.S. PATENT DOCUMENTS

| | | | | |
|---|---|---|---|---|
| 5,946,321 | A * | 8/1999 | Dean | .................... H04L 12/2801 370/403 |
| 6,041,048 | A * | 3/2000 | Erickson | ................. H04L 47/24 370/328 |
| 6,438,603 | B1 * | 8/2002 | Ogus | ....................... H04L 47/10 370/238 |
| 7,035,899 | B2 * | 4/2006 | Marchon | ........... H04L 29/06027 348/E7.083 |
| 8,599,266 | B2 * | 12/2013 | Trivedi et al. | ................. 348/169 |
| 8,842,179 | B2 * | 9/2014 | Renkis | ............. G08B 13/19619 348/143 |
| 8,964,830 | B2 * | 2/2015 | Perlman et al. | ......... 375/240.01 |
| 9,148,613 | B1 * | 9/2015 | Goldberg | ........... H04N 5/44591 |

(Continued)

FOREIGN PATENT DOCUMENTS

WO    2009154657 A1    12/2009

*Primary Examiner* — Shan Elahi (57) ABSTRACT

Multiple cameras are operatively connected over a shared link to a video server on a video network. The cameras are operated to capture a plurality of video streams. Each video stream has intra-frames and predictive frames that are sequentially generated timewise apart. A number of the video streams that transmit over the shared link on the network is identified. A number of intra-frames that are generated substantially simultaneously in the identified video streams is also identified. The identified intra-frames in the video streams are offset in time to minimize video artifacts from being present in the video streams being transmitted over the shared link.

20 Claims, 5 Drawing Sheets

(56) References Cited

U.S. PATENT DOCUMENTS

| | | | |
|---|---|---|---|
| 2002/0032028 A1* | 3/2002 | Kaupe | H04B 7/18519 455/427 |
| 2002/0080785 A1* | 6/2002 | Prakash | H04L 12/5692 370/389 |
| 2002/0170064 A1* | 11/2002 | Monroe | H04N 7/181 725/105 |
| 2004/0022222 A1* | 2/2004 | Clisham | H04L 69/18 370/338 |
| 2004/0093618 A1 | 5/2004 | Baldwin et al. | |
| 2004/0095907 A1* | 5/2004 | Agee | H04B 7/0417 370/334 |
| 2004/0136388 A1* | 7/2004 | Schaff | 370/401 |
| 2004/0196378 A1* | 10/2004 | Kannermark | H04N 5/2258 348/207.99 |
| 2005/0015719 A1* | 1/2005 | Marchon | H04L 29/06027 715/202 |
| 2006/0200845 A1* | 9/2006 | Foster et al. | 725/81 |
| 2006/0279628 A1* | 12/2006 | Fleming | G11B 27/034 348/143 |
| 2007/0016405 A1* | 1/2007 | Mehrotra | G10L 19/025 704/203 |
| 2007/0183756 A1* | 8/2007 | Vaughan | H04N 5/91 386/211 |
| 2007/0201365 A1* | 8/2007 | Skoog | H04L 47/10 370/230.1 |
| 2008/0115185 A1* | 5/2008 | Qiu | H04N 21/2343 725/118 |
| 2008/0263056 A1* | 10/2008 | Murray | G06F 17/30017 |
| 2008/0282299 A1* | 11/2008 | Koat | H04L 12/14 725/93 |
| 2008/0288986 A1* | 11/2008 | Foster | G08B 13/19656 725/62 |
| 2009/0002157 A1* | 1/2009 | Donovan | H04N 7/18 340/540 |
| 2009/0141800 A1 | 6/2009 | Larson | |
| 2010/0097473 A1* | 4/2010 | Park | H04N 5/23203 348/159 |
| 2010/0115411 A1* | 5/2010 | Sorokin et al. | 715/723 |
| 2010/0135643 A1* | 6/2010 | Fleming | G11B 27/034 386/224 |
| 2010/0141761 A1* | 6/2010 | McCormack | 348/143 |
| 2011/0216192 A1* | 9/2011 | Leung et al. | 348/143 |
| 2012/0105632 A1* | 5/2012 | Renkis | G08B 13/19619 348/143 |
| 2012/0119879 A1* | 5/2012 | Estes | G08B 13/19641 340/8.1 |
| 2012/0262576 A1* | 10/2012 | Sechrist | H04N 21/21805 348/143 |
| 2013/0201316 A1* | 8/2013 | Binder | H04L 67/12 348/77 |
| 2013/0262585 A1* | 10/2013 | Niemeyer | H04L 65/60 709/204 |
| 2014/0320697 A1* | 10/2014 | Lammers et al. | 348/231.99 |

* cited by examiner

APPARATUS FOR AND METHOD OF IDENTIFYING VIDEO STREAMS TRANSMITTED OVER A SHARED NETWORK LINK, AND FOR IDENTIFYING AND TIME-OFFSETTING INTRA-FRAMES GENERATED SUBSTANTIALLY SIMULTANEOUSLY IN SUCH STREAMS

FIELD OF THE DISCLOSURE

The present disclosure relates generally to an apparatus for, and a method of, operating a video network having a plurality of cameras that generate video streams and, more particularly, to identifying a number of the video streams that are transmitted over a shared link on the network, and to identifying a number of intra-frames that are generated substantially simultaneously in such video streams, and to time-offsetting the identified number of the intra-frames to minimize video artifacts from being present in the video streams being transmitted over the shared link.

BACKGROUND

Many municipalities, businesses, and other institutions are implementing extensive, large scale, video surveillance networks having multiple video cameras arranged outdoors and/or indoors at various venues for security purposes, as well as for remote monitoring in public and private areas that may need monitoring such as traffic intersections, toll booths, airports, public events, banks, casinos, military installations, convenience stores, and the like. Closed-circuit television (CCTV) systems may operate continuously, or only as required, to monitor a particular venue, and typically run dedicated coaxial cable to each camera. The advent of internet protocol (IP)-based, stand-alone, digital video cameras has removed the need to run coaxial cables. Instead, the video cameras generate video streams, which are typically digitized, compressed, and multiplexed onto a common physical medium or shared backhaul, e.g., a fiber ring, a point-to-point wireless link, an Ethernet network, and the like. For example, ten to thirty or more IP cameras may share a single, fixed bandwidth-limited, backhaul.

Multiplexing is, in part, made possible through the use of digital video compression technology. Modern video codecs, e.g., MPEG4-PART2, H.264, H.EVC, and the like, encode and decode video streams at incredible compression ratios through the use of predictive encoding. In a motion sequence, a video stream comprises a plurality of pictures or frames of different types and generated at a frame rate, e.g., thirty frames per second. One type of frame is an intra-frame or I-frame (also known as a key frame), which is a single frame of digital content that stores all the data needed to display the image of that frame, and is a stand-alone or independent frame that does not rely on data from any other frame to display the image of that frame. A predictive frame or P-frame (also known as a delta frame) is another type of frame, and is a single frame that contains only the data that has changed from a preceding frame. A P-frame sequentially follows, and depends on, an I-frame to fill in most of the data to display the image of that P-frame. Another type of predictive frame is a bidirectional frame or B-frame (also known as a delta frame), and is a single frame that contains data that has changed from a preceding frame, and/or contains data that is changed from the data in the next frame. A B-frame thus depends on the frames preceding and following it to fill in the data to display the image of the B-frame.

Predictive frames, e.g., P- and B-frames, typically use temporal compensation to move around texture-coded pixels from previous and/or future frames. While this digital process radically reduces the amount of bandwidth required to transmit a video stream, as compared to an analog process, it also makes predictive frames susceptible to errors. An error in a single predictive frame can propagate forward in time as future frames apply motion compensation. This, in turn, causes erroneous data to eventually corrupt the integrity of the video stream over time.

To combat such errors, the aforementioned intra-frames are regularly inserted, as fully texture-coded frames, into the video stream to clean up any residual errors. A typical intra-frame insertion rate is one intra-frame every one or two seconds. An intra-frame is relatively large, e.g., an order of magnitude larger, with respect to each predictive frame. When an encoder in, or associated with, the video camera is programmed to provide a constant bit rate, e.g., about 6 megabits per second (mb/s), then the bit rate will instantaneously spike much higher, e.g., to about 30 mb/s, than the programmed bit rate when an intra-frame is generated, and then lower, e.g., to about 5 mb/s, when predictive frames are generated.

In a typical video surveillance network deployment, the video streams from multiple cameras are backhauled to a central location for control by a network video recorder (NVR), also known as a video server. The NVR is operative for recording and for viewing the video streams at a control station typically manned by human operators. When that backhaul comprises a point-to-point wireless link, the aforementioned bit rate spikes can become particularly problematic, because such a wireless link typically operates at a fixed, constant data rate. As such, large intra-frames can take appreciably longer to transmit over the wireless link than smaller predictive frames. This induces jitter into the video stream, which is an issue for real-time video delivery. Jitter, as used herein, is defined as the variation in arrival times of packets comprising video frames in a video stream. Also, a large intra-frame can cause a buffer in a modem of the wireless link to overflow, thereby inducing packet loss. The NVR receiving the video stream typically buffers some nominal (short) time period for the packets comprising a frame to arrive. In some instances, if all of the packets comprising a given frame do not arrive within that nominal time period, then the NVR treats the data as missing, and the resulting decoded data exhibits errors. If the NVR instead waits for all of the packets comprising the frame to arrive, then the resulting video stream will appear "jerky" to a viewer, as the time difference between the frames is inconsistent.

This effect is exacerbated as multiple cameras are multiplexed over the same shared wireless link. Furthermore, it becomes really problematic if those cameras are all generating intra-frames at approximately the same instant in time. It is a common occurrence for the NVR to control and configure all of the cameras to operate in a near simultaneous/parallel fashion, which, in turn, sets up nearly synchronized intra-frames. At network startup configuring each camera resets a clock in each camera. Even if the cameras start off with unsynchronized intra-frames, cameras that are programmed for the same intra-frame period, i.e., the time interval between successive intra-frames in a video stream, e.g., typically about 1 second, may eventually, through clock drift, align and overlap the intra-frames, at least for a certain amount of time.

Thus, it is known to configure video surveillance network architecture such that the intra-frames in video streams from multiple cameras are generated in unison, or nearly so. However, the shared wireless link cannot readily accommodate the massive instantaneous bit rate. For example, if the average bit rate of each camera is configured for 6 mb/s, then ten such cameras can theoretically comfortably share a fixed 100 mb/s link, or even more so, a 200 mb/s wireless link. However, if intra-frames having an instantaneous bit rate of about 30 mb/s overlap, then 10×30 mb/s=300 mb/s, and this will significantly overload the 200 mb/s wireless link. This will delay (jitter) or drop (buffer overflow) frames, thereby causing unacceptable video artifacts in the video streams. This problem not only applies to wireless links, but also to Ethernet switches and routers having low data switching and/or throughput rates.

To prevent such intra-frames from being substantially simultaneously generated, it is known to operate the cameras at different times. However, when thousands of cameras are involved (some cameras sharing a common backhaul, and some cameras not sharing a common backhaul), the video network would require a complex control system, and, even so, it is difficult to determine which of the thousands of cameras are sharing a common backhaul and are simultaneously generating intra-frames. A known way to determine which of the cameras are sharing a common backhaul is to refer to a detailed network map or "blueprint." If the blueprint exists, then the cameras which share a common backhaul can be statically identified, but, even so, the blueprint cannot identify which cameras are indeed simultaneously generating intra-frames. Nor can the blueprint identify intra-frames that overlap due to clock drift. Often however, a blueprint does not exist. This is common for cameras which are setup to cover ad-hoc events, e.g., a civic festival downtown, or for networks that grew organically without architectural oversight. In such cases, it is not sufficient to simply run an internet control management protocol (ICMP) "traceroute" to uncover common network elements. In any event, the "traceroute" identifies only layer 4 routing elements, and does not identify shared Ethernet switches and point-to-point links.

Accordingly, it would be desirable to reliably identify which of the video streams of the cameras are sharing a wireless link in a video surveillance network, as well as which of the video streams are simultaneously generating intra-frames, especially when no network blueprint exists, and to time-offset such intra-frames to minimize or prevent unacceptable video artifacts from being present in the video streams transmitted over such shared links, while using cost-effective, off-the-shelf cameras, without sacrificing video quality.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a method of operating a video network. The method is performed by operatively connecting a plurality of cameras over a shared link to a video server on the network, and by operating each camera to capture a corresponding plurality of video streams, each video stream having intra-frames and predictive frames that are sequentially generated timewise apart. The method is further performed by identifying a number of the video streams that are transmitted over the shared link, preferably a wireless link, on the network, and by identifying a number of the intra-frames that are generated substantially simultaneously in the identified number of the video streams, and by time-offsetting the identified number of the intra-frames to minimize video artifacts from being present in the video streams being transmitted over the shared link.

Advantageously, the identifying is performed by analyzing candidate ones of the video streams, and by determining which of the candidate video streams share the shared link and generate their respective intra-frames within an allowable time offset relative to one another. More particularly, the analyzing is performed by correlating peaks in instantaneous jitter above a predetermined threshold and/or peaks in instantaneous packet loss rate above a predetermined threshold, in the candidate video streams with occurrences of the intra-frames of the candidate video streams. The identifying is further performed by analyzing other ones of the video streams when these peaks are uncorrelated with the occurrences of the intra-frames.

The time-offsetting is performed, in one example, by adjusting when the video streams begin to stream by operating each camera at different times, and, in another example, by adjusting respective intra-frame periods of the video streams, and, in still another example, by adjusting when each intra-frame is generated.

An apparatus, in accordance with another aspect of this disclosure, is operative for operating a video network. The apparatus includes a plurality of cameras operatively connected together over a shared link on the network, and a video server on the network for operating each camera to capture a corresponding plurality of video streams. Each video stream has intra-frames and predictive frames that are sequentially generated timewise apart. The video server is operative for identifying a number of the video streams that are transmitted over the shared link, preferably a wireless link, on the network, and for identifying a number of the intra-frames that are generated substantially simultaneously in the identified number of the video streams, and for time-offsetting the identified number of the intra-frames to minimize video artifacts from being present in the video streams being transmitted over the shared link. More particularly, the video server is operative for correlating peaks in instantaneous jitter above a predetermined threshold and/or peaks in instantaneous packet loss rate above a predetermined threshold, in the video streams that share the shared link with occurrences of the intra-frames of such video streams.

Figure 1:
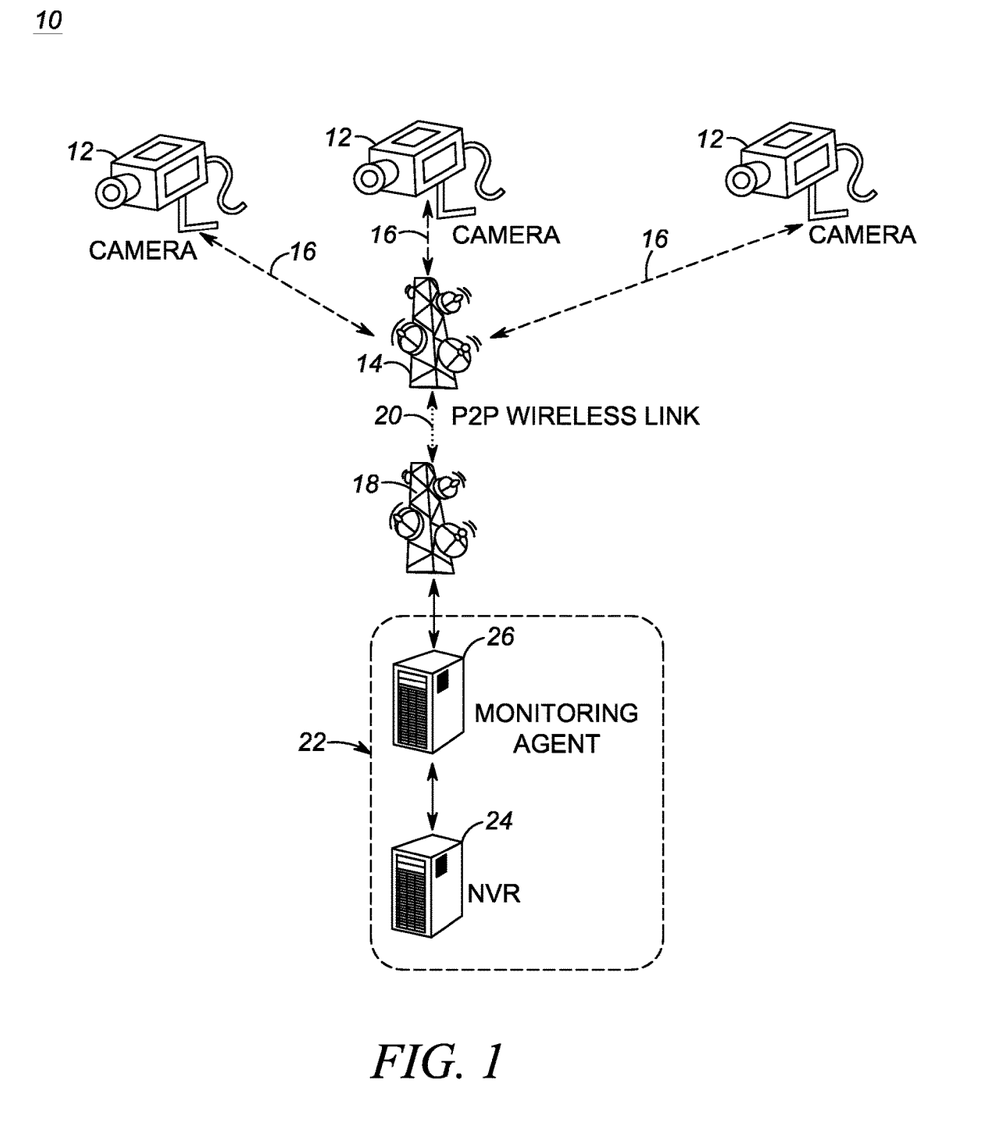
FIG. 1 is a diagrammatic view of a video surveillance network depicting cameras whose video streams share a common, bandwidth-constrained, backhaul or wireless link and substantially simultaneously generate intra-frames to be identified and time-offset in accordance with the present disclosure.

Turning now to the drawings, reference numeral 10 in FIG. 1 generally identifies a video surveillance network having a plurality of video cameras 12 arranged about a venue to be monitored. Each camera 12 is coupled to a radio frequency (RF) transceiver operatively connected to a wireless network 14 having RF antennas and transceivers, preferably over individual bi-directional wireless links 16 for transmission and reception of digital video data and control data. The wireless network 14 is operatively connected to a base station 18, also having RF antennas and transceivers, preferably over a shared, bi-directional, point-to-point (P2P) wireless link 20 for further transmission and reception of the digital video data and control data to a video server 22. As illustrated, the video server 22 includes a network video recorder 24 (NVR) and a monitoring computer or agent 26.

Although three cameras 12 are illustrated in FIG. 1, it will be understood that the network 10 may have two cameras, but preferably many more cameras, and, in a typical deployment, tens, hundreds, or thousands of cameras, may be deployed. The cameras 12 may be cost-effective, off-the-shelf, stand-alone cameras that do not directly communicate with one another. It will be further understood that the wireless network 14 and the base station 18 can be combined into a single structure, or may include many other satellite structures. It will still be further understood that the monitoring agent 26 need not be a computer external to the NVR 24 as illustrated, but may be integrated in the NVR 24, in which case, the NVR 24 is the sole component of the video server 22.

The video server 22 is a programmed computer that controls all the cameras 12 to capture a corresponding plurality of video streams. As described above, each camera is capable of digitizing and compressing (encoding) the video data generated by each camera 12. As described above, each video stream has intra-frames (I-frames) and predictive frames (P- and/or B-frames) that are sequentially generated timewise apart. By way of example, if a camera is capturing images at a frame rate of thirty frames per second, then an intra-frame may be generated at an intra-frame period or rate of once each second, while the other twenty-nine frames are predictive frames. Of course, other sequences of intra-frames and predictive frames may be employed. As explained in detail below, the video server 22 is operative for identifying a number of the video streams that are being transmitted over the shared link 20, for identifying a number of the intra-frames that are being generated substantially simultaneously in the identified number of the video streams, and for time-offsetting the identified number of the intra-frames to minimize video artifacts from being present in the video streams being transmitted over the shared link 20.

The number of the intra-frames to be offset may be a value anywhere between all, or a minimum, of the number of cameras. For example, if thirty cameras are deployed, then it would be desirable to offset the intra-frames from the video streams of all thirty of the cameras, or from a minimum number, e.g., two, of the cameras, or some value between two and thirty. To determine which, and how many, intra-frames are to be offset, this disclosure proposes how to identify or determine which ones, and how many, of the video streams of the cameras 12 are sharing the same bandwidth-constrained, backhaul or wireless link 20.

Thus, one aspect of this disclosure proposes that a subset, or all, of the video streams entering the video server 22 be analyzed, either by the NVR 24 itself, or, in a preferred embodiment, by the monitoring agent 26 that is co-resident or external to the NVR 24. The video server 22 measures the instantaneous jitter and the instantaneous packet loss rate of each video stream to be analyzed, and records this information along with the frame type (intra-frame or predictive) and the corresponding clock time. Video streams that exhibit intra-frames occurring at approximately the same clock time, i.e., within an allowable time offset, and that exhibit similar, excessive jitter, i.e., peaks above a predetermined threshold at approximately the same clock time, and/or exhibit similar, excessive packet loss rates, i.e., peaks above a predetermined threshold within an allowable time offset from when intra-frames are generated, are identified as being candidates for sharing the same backhaul link 20.

Figure 2:
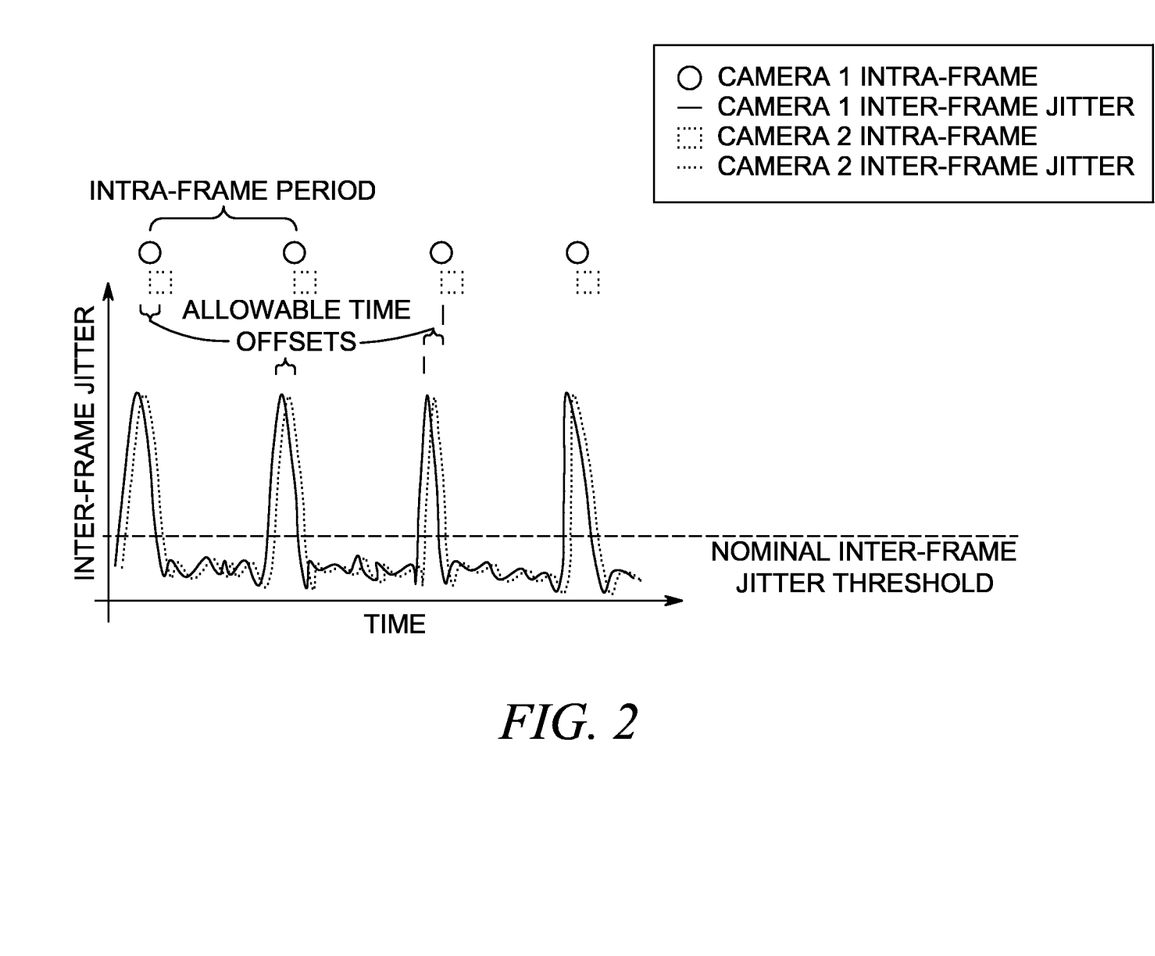
FIG. 2 is a graph comparing jitter of two video streams and their correlated intra-frame occurrences when identifying video streams that are sharing the same wireless link in accordance with the present disclosure.

Thus, as illustrated in FIG. 2, the inter-frame jitter from the video streams of two different candidate cameras 1 and 2 generally track each other and are similar in shape, e.g., their peaks occur within an allowable time offset and have approximately the same magnitude that is elevated above a known threshold. Analogously, the packet loss rates from the video streams of two different candidate cameras 1 and 2 generally track each other and are similar in shape, e.g., their peaks occur within an allowable time offset and have approximately the same magnitude that is elevated above a known threshold. Also, each occurrence of intra-frames (represented by circular dots) from camera 1 occurs within an allowable time offset with each occurrence of intra-frames (represented by squares) from camera 2. The sequential occurrence of the peaks (in jitter and/or in packet loss rate), together with the sequential occurrence of the intra-frames, from the video streams of the candidate cameras 1 and 2, which is repeated multiple times in the respective video streams, signify that there is a correlation between these occurrences, and that the shared link 20 is constrained, and that a corrective time-offsetting action should be undertaken.

Once two or more video streams are identified as potentially sharing the same backhaul link 20, the invention takes one of the several corrective offsetting actions, as described below, in order to stagger the generation of the intra-frames by these cameras. Once corrective action has been taken, the above comparative analysis may be re-run to determine if the problem has been resolved. If the problem persists, then it either indicates that the corrective action was ineffective, or that the video streams of the two candidate cameras were not, in fact, sharing the same backhaul link 20. In such instances, any corrective offsetting action may be repealed. Further, in some embodiments, additional corrective actions may be attempted.

Figure 3:
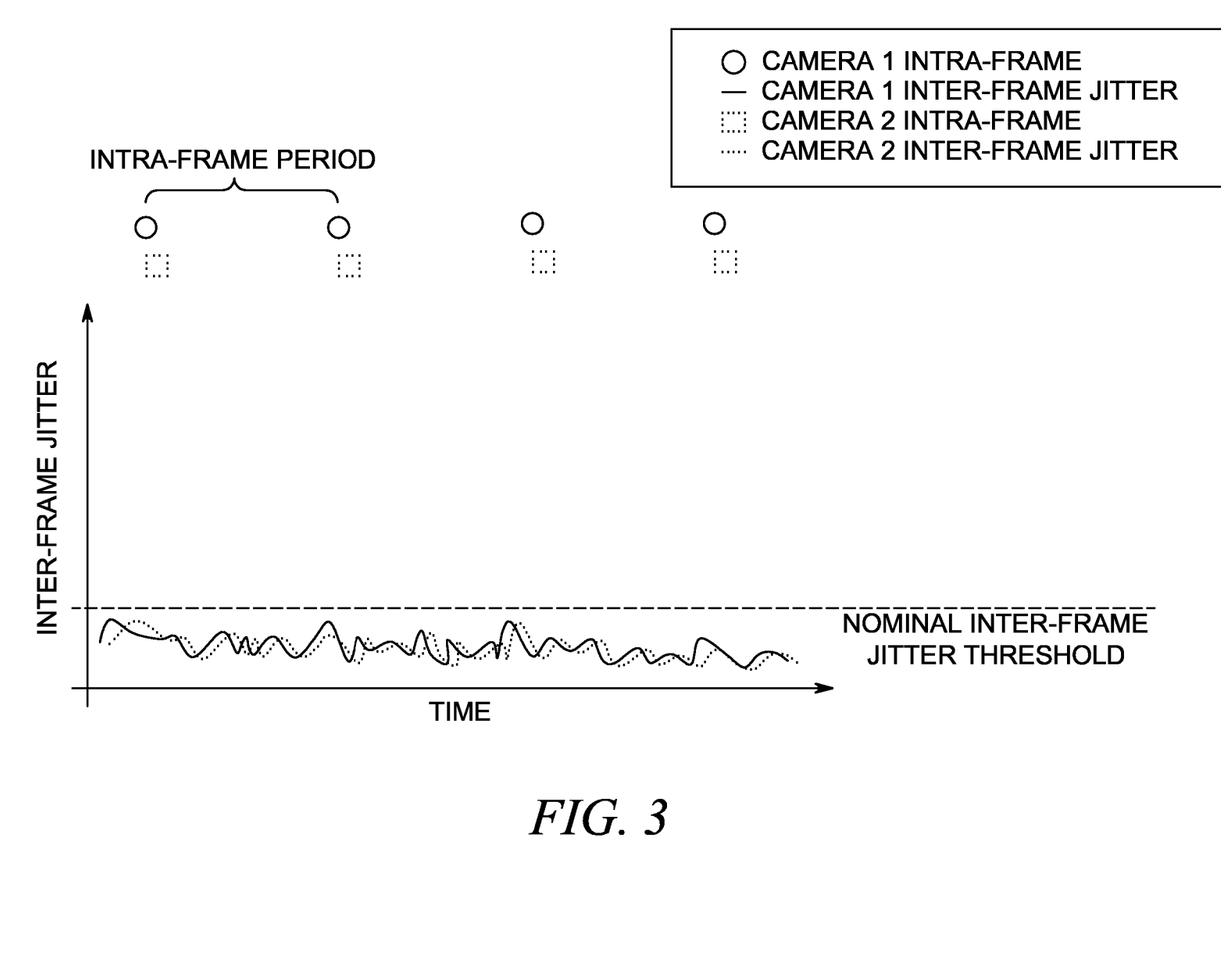
FIG. 3 is a graph analogous to FIG. 2, but depicting the jitter of two video streams and their uncorrelated intra-frame occurrences in accordance with the present disclosure.

For completeness, FIG. 3 is analogous to FIG. 2, and shows no peaks above the nominal jitter threshold. There is no correlation between the sequential occurrences of the intra-frames with the jitter of the candidate cameras. An analogous situation could exist for packet loss rates. This signifies that the shared link 20 is not constrained, and that a corrective time-offsetting action need not be undertaken.

Figure 4:
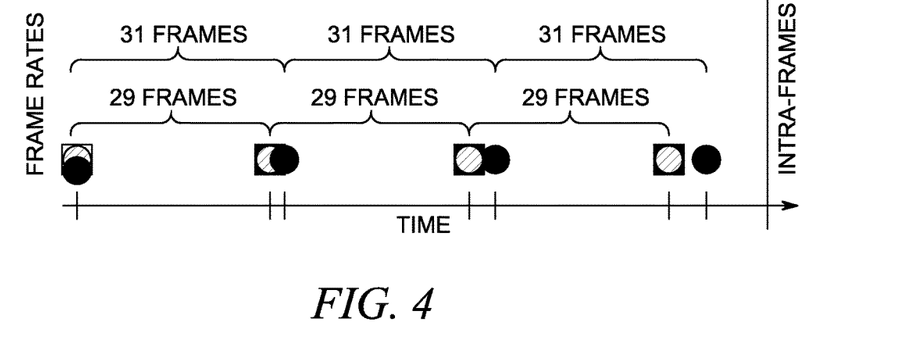
FIG. 4 is a graph depicting adjusting intra-frame periods versus time in accordance with the present disclosure.

Various corrective offsetting actions may be employed. For example, the identified cameras 12 may be automatically re-programmed by the video server 22 with non-identical intra-frame periods slightly offset from one another. For example, if a nominal intra-frame period of 30 frames is desired for two cameras 12 whose video streams are determined to be sharing the same backhaul link 20, then, as shown in FIG. 4, one camera may be programmed for an intra-frame period of 29 frames, while the other is programmed for an intra-frame period of 31 frames. The video server 22 will continually subtract/add 1 frame (e.g., to 28 or 32 frames) to the nominal number of 30 frames per intra-frame period for each additional camera 12 whose video stream is determined to share the same backhaul link 20. In some embodiments, there may be a maximum variance (e.g., 15 frames) from the nominal intra-frame period allowed.

Figure 5:
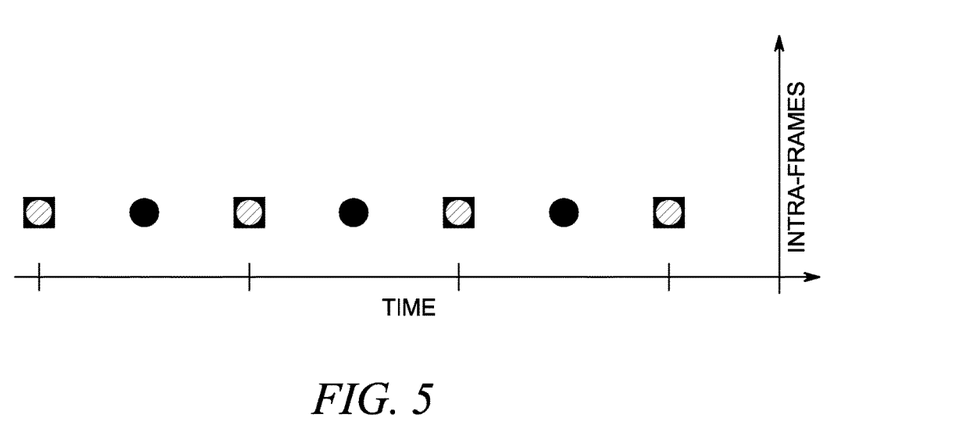
FIG. 5 is a graph depicting generating intra-frames at different times in accordance with the present disclosure.

As another example, as shown in FIG. 5, the identified cameras 12 may be re-programmed by the video server 22 to not automatically generate intra-frames at regular intervals, or to automatically generate intra-frames at very long periods. The video server 22 regularly requests that the identified cameras 12 manually generate intra-frames. In this way, the video server 22 can intentionally stagger the requests for generating intra-frames, such that the requested intra-frames are honored, but are offset from one another in time.

As still another example, the identified cameras 12 may be re-programmed by the video server 22 at different times with the same nominal intra-frame period. For some camera models, the act of reprogramming the intra-frame period, or of requesting a video stream, will cause their clock to re-set, thus resulting in subsequently offset intra-frames. In a related embodiment, the identified cameras 12 are commanded to start streaming video to the video server 22 at times slightly offset from one another. In a variant, the video server 22 randomly commands the cameras 12 to start streaming video without specific regard to time offset.

In yet another example, the cameras 12 may be programmed for the same intra-frame period. The video server 22, however, then manually requests an intra-frame from one of the identified cameras 12 at an offset time. For some cameras models, the act of manually requesting an intra-frame will cause their clock to reset, thus resulting in subsequently offset intra-frames.

In some instances, the number of cameras 12 sharing the same backhaul link 20 may exceed the resolution of available intra-frame period time offsets. In these instances, multiple cameras 12 may generate intra-frames at the same time. Care is taken, however, to load balance the number of cameras 12 generating intra-frames at the same offset.

Figure 6:
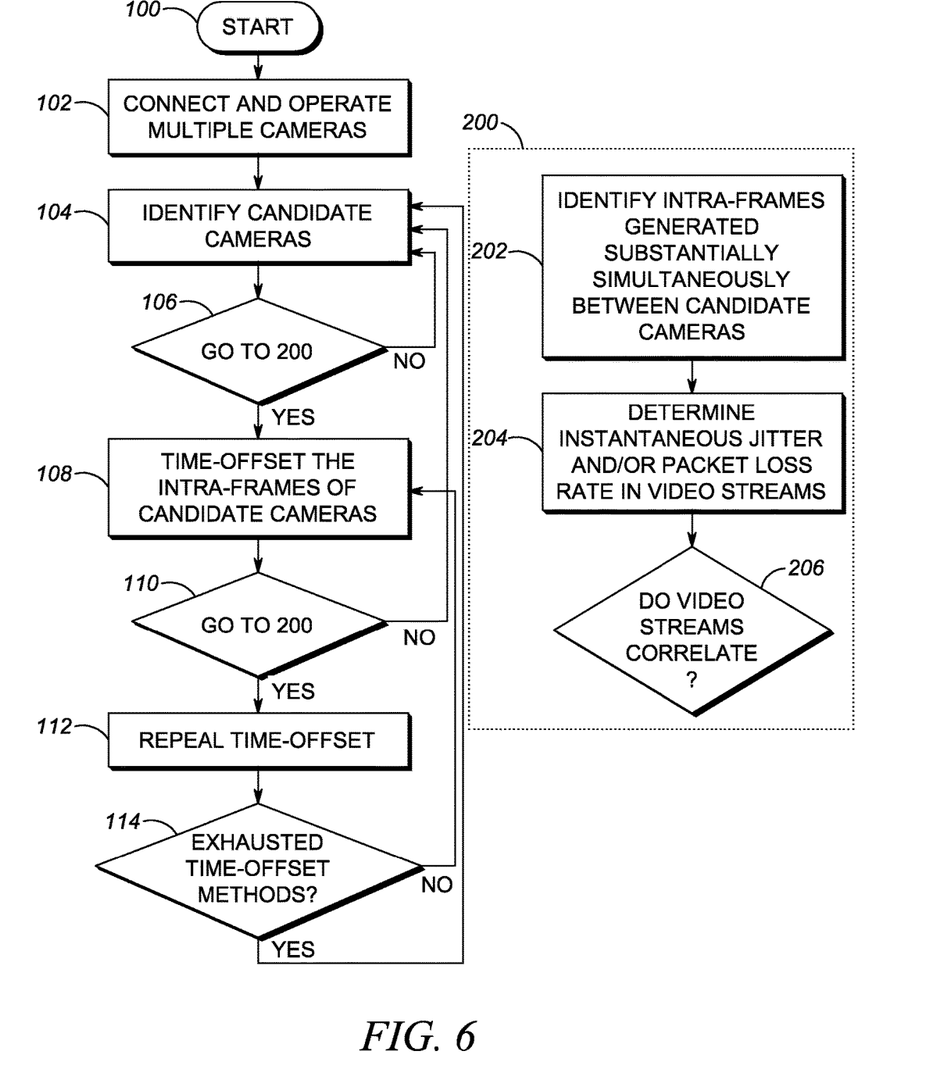
FIG. 6 is a flow chart in accordance with the method of the present disclosure.

Turning now to the flow chart of FIG. 6, beginning at start step 100, multiple cameras 12 are operatively connected over the network 10 and are operated in step 102 to capture a corresponding plurality of video streams, each video stream having intra-frames and predictive frames that are sequentially generated timewise apart. In step 104, a first subset or number of candidate ones of the cameras 12 is identified and selected, and their video streams are analyzed in decision step 106 by executing a routine or algorithm 200 that is comprised of steps 202, 204, and 206. In step 202, a number of the intra-frames that are generated substantially simultaneously in the identified video streams of the first subset of candidate cameras is identified. In step 204, the above-described jitter and/or packet loss rate of the identified video streams of the candidate cameras is determined. In decision step 206, the above-described correlation between the identified intra-frames and the jitter and/or packet loss rate of the identified video streams is determined. If there is no correlation, then the method returns to step 104 to identify other candidate cameras. If there is correlation, then, in step 108, the identified number of the intra-frames is time-offset to minimize video artifacts from being present in the video streams being transmitted over the shared link 20.

The method is continued at decision step 110 to determine if the time-offsetting action between the candidate cameras was successful by executing the routine 200 over the first set of candidate cameras. If there is no longer any correlation, then the time-offsetting action of step 108 was successful, and the method continues at step 104 to identify a second subset or other candidate cameras. If the time-offsetting was unsuccessful, then the time-offsetting action of step 108 is repealed at step 112. Step 114 checks whether the time-offsetting actions have been exhausted. If not, then the method returns to step 108 using a different time-offsetting action. Otherwise, the method continues at step 104 to identify a second subset or other candidate cameras.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of operating a video network, comprising:
   operatively connecting a plurality of cameras over a shared link to a video server on the network;
   operating each camera to capture a corresponding plurality of video streams, each video stream having intra-frames and predictive frames that are sequentially generated timewise apart;
   identifying video streams from the plurality of video streams that were transmitted over the shared link on the network;
   identifying the intra-frames that are generated substantially simultaneously in the identified number of the video streams; and
   time-offsetting the identified.

2. The method of claim 1, and configuring the shared link as a wireless link.

3. The method of claim 1, wherein the identifying is performed by analyzing candidate ones of the video streams, and by determining which of the candidate video streams generate their respective intra-frames within an allowable time offset relative to one another.

4. The method of claim 3, wherein the analyzing is performed by correlating peaks above a predetermined threshold in one of jitter and packet loss rate of the candidate video streams with occurrences of the intra-frames of the candidate video streams.

5. The method of claim 4, wherein the identifying is performed by analyzing other ones of the video streams when the peaks are uncorrelated with the occurrences of the intra-frames.

6. The method of claim 1, wherein the time-offsetting is performed by adjusting when the video streams begin to stream by operating each camera at different times.

7. The method of claim 1, wherein the identifying is performed by analyzing all of the video streams.

8. The method of claim 1, wherein the time-offsetting is performed by adjusting respective intra-frame periods of the video streams.

9. The method of claim 1, wherein the time-offsetting is performed by adjusting when each identified intra-frame is generated.

10. An apparatus for operating a video network, comprising:
    a plurality of cameras operatively connected together over a shared link on the network;
    a video server on the network for operating each camera to capture a corresponding plurality of video streams, each video stream having intra-frames and predictive frames that are sequentially generated timewise apart, the video server being operative for:
      identifying the video streams from the plurality of video streams transmitted over the shared link on the network;
      identifying the intra-frames that are generated substantially simultaneously in the identified number of the video streams;
      time-offsetting the identified intra-frames.

11. The apparatus of claim 10, wherein the shared link is a wireless link.

12. The apparatus of claim 10, wherein the video server is operative for analyzing candidate ones of the video streams, and for determining which of the candidate video streams generate their respective intra-frames within an allowable time offset relative to one another.

13. The apparatus of claim 12, wherein the video server is operative for correlating peaks above a predetermined threshold in one of jitter and packet loss rate of the candidate video streams with occurrences of the intra-frames of the candidate video streams.

14. The apparatus of claim 13, wherein the video server is operative for analyzing other ones of the video streams when the peaks are uncorrelated with the occurrences of the intra-frames.

15. The apparatus of claim 10, wherein the video server is operative for adjusting when the video streams begin to stream by operating each camera at different times.

16. The apparatus of claim 10, wherein the video server is operative for adjusting respective intra-frame periods of the video streams.

17. The apparatus of claim 10, wherein the video server is operative for adjusting when each identified intra-frame is generated.

18. The apparatus of claim 10, wherein the video server includes a network video recorder.

19. The apparatus of claim 18, wherein the video server further includes a monitoring agent.

20. The apparatus of claim 10, wherein each camera is a stand-alone device that does not communicate directly with any of the other cameras.

* * * * *